United States Patent
Varadarajan (10) Patent No.: US 9,690,790 B2
(45) Date of Patent: Jun. 27, 2017

(54) METHOD AND APPARATUS FOR EFFICIENTLY MERGING, STORING AND RETRIEVING INCREMENTAL DATA

(75) Inventor: Srinidhi Varadarajan, Blacksburg, VA (US)

(73) Assignee: Dell Software Inc., Aliso Viejo, CA (US)

( * ) Notice: Subject to any disclaimer, the term of this patent is extended or adjusted under 35 U.S.C. 154(b) by 622 days.

(21) Appl. No.: 12/034,300

(22) Filed: Feb. 20, 2008

(65) Prior Publication Data

US 2008/0222219 A1 Sep. 11, 2008

Related U.S. Application Data

(60) Provisional application No. 60/893,015, filed on Mar. 5, 2007.

(51) Int. Cl.
*G06F 17/00* (2006.01)
*G06F 17/30* (2006.01)

(52) U.S. Cl.
CPC ............... *G06F 17/30088* (2013.01)

(58) Field of Classification Search
CPC ........... G06F 11/1435; G06F 17/30088; G06F 2201/84; G06F 11/1448; G06F 11/1458
USPC ................ 707/999.2, 999.204; 714/E11.136; 711/216; 726/6
See application file for complete search history.

(56) References Cited

U.S. PATENT DOCUMENTS

| | | |
|---|---|---|
| 4,631,673 A | 12/1986 | Haas et al. |
| 5,287,496 A | 2/1994 | Chen et al. |
| 6,192,377 B1 | 2/2001 | Ganesh et al. |
| 6,393,544 B1 | 5/2002 | Bryg et al. |
| 6,434,681 B1 | 8/2002 | Armangau |
| 6,604,118 B2 | 8/2003 | Kleiman et al. |

(Continued)

FOREIGN PATENT DOCUMENTS

| | | |
|---|---|---|
| CN | 1567262 A | 1/2005 |
| EP | 0 501 180 | 9/1992 |

(Continued)

OTHER PUBLICATIONS

Xie, G., et al., "Esnap—A Cached Dependent Snapshot System," Proceedings of the 2007 IEEE International Conference on Integration Technology, pp. 783-788, Mar. 20-24, 2007.

(Continued)

*Primary Examiner* — Ann J Lo
(74) *Attorney, Agent, or Firm* — Winstead PC (57) ABSTRACT

In a method and apparatus for retrieving data from a snapshot data storage system, for each epoch, a snapshot including (i) all changed data, and (ii) an index is created. The index includes an entry for each page that has changed during the epoch. For rapidly retrieving the data as of any given time, the method creates a hash table that includes an entry for each data page that has changed since the baseline was created. The hash table entry indicates the epoch in which the data most recently changed and an offset corresponding to the location of the changed data in the corresponding snapshot. The hash table is created by inserting an entry for each page in the most recent index, and then examining the remaining indices for all other snapshots from the most recent to the oldest snapshot and adding any non-duplicate entries into the table.

14 Claims, 6 Drawing Sheets

300

| Page Number$_1$ | Offset$_1$ |
|---|---|
| Page Number$_2$ | Offset$_2$ |
| ⋮ | ⋮ |

(56) References Cited

U.S. PATENT DOCUMENTS

| | | |
|---|---|---|
| 6,912,645 B2 | 6/2005 | Dorward et al. |
| 6,934,822 B2 | 8/2005 | Armangau et al. |
| 7,039,663 B1 | 5/2006 | Federwisch et al. |
| 7,047,380 B2 | 5/2006 | Tormasov et al. |
| 7,111,136 B2 | 9/2006 | Yamagami |
| 7,162,601 B2 | 1/2007 | Yamagami |
| 7,171,538 B2 | 1/2007 | Kisley et al. |
| 7,243,197 B2 | 7/2007 | Yamagami |
| 7,246,211 B1 | 7/2007 | Beloussov et al. |
| 7,266,655 B1 | 9/2007 | Escabi, II et al. |
| 7,376,790 B2 | 5/2008 | Lango et al. |
| 7,464,100 B2 | 12/2008 | Schreter |
| 7,694,088 B1 | 4/2010 | Bromley et al. |
| 7,934,064 B1 | 4/2011 | Per et al. |
| 8,200,638 B1 | 6/2012 | Zheng et al. |
| 8,352,431 B1 | 1/2013 | Protopopov et al. |
| 8,627,500 B2 | 1/2014 | Rogel et al. |
| 2003/0084038 A1 | 5/2003 | Balogh et al. |
| 2003/0084039 A1 | 5/2003 | Balogh |
| 2003/0084057 A1 | 5/2003 | Balogh |
| 2003/0084074 A1 | 5/2003 | Balogh et al. |
| 2003/0084075 A1 | 5/2003 | Balogh et al. |
| 2003/0131253 A1 | 7/2003 | Martin et al. |
| 2003/0167380 A1 | 9/2003 | Green et al. |
| 2004/0010487 A1 | 1/2004 | Prahlad et al. |
| 2004/0030727 A1* | 2/2004 | Armangau et al. ........... 707/200 |
| 2004/0243775 A1 | 12/2004 | Coulter et al. |
| 2005/0055354 A1 | 3/2005 | Thompson et al. |
| 2005/0102297 A1 | 5/2005 | Lloyd et al. |
| 2005/0149472 A1 | 7/2005 | Schreter |
| 2005/0165828 A1 | 7/2005 | Lango et al. |
| 2005/0187992 A1 | 8/2005 | Prahlad et al. |
| 2005/0193026 A1 | 9/2005 | Prahlad et al. |
| 2006/0041727 A1 | 2/2006 | Adkins et al. |
| 2006/0047926 A1 | 3/2006 | Zheng |
| 2006/0047996 A1 | 3/2006 | Anderson et al. |
| 2006/0107006 A1 | 5/2006 | Green et al. |
| 2006/0265489 A1 | 11/2006 | Moore |
| 2007/0043790 A1 | 2/2007 | Kryger |
| 2007/0185940 A1 | 8/2007 | Prahlad et al. |
| 2008/0091655 A1 | 4/2008 | Gokhale et al. |
| 2009/0043814 A1 | 2/2009 | Faris et al. |
| 2009/0182963 A1 | 7/2009 | Prahlad et al. |
| 2009/0240748 A1 | 9/2009 | Prahlad et al. |
| 2010/0262597 A1 | 10/2010 | Han |
| 2010/0287141 A1 | 11/2010 | Prahlad et al. |
| 2011/0066599 A1 | 3/2011 | Prahlad et al. |
| 2011/0125714 A1 | 5/2011 | Manson |
| 2011/0161297 A1 | 6/2011 | Parab |
| 2011/0173404 A1 | 7/2011 | Eastman et al. |
| 2012/0284233 A1 | 11/2012 | Otani |
| 2013/0066981 A1 | 3/2013 | Park et al. |

FOREIGN PATENT DOCUMENTS

| | | |
|---|---|---|
| WO | WO 03/038596 | 5/2003 |
| WO | 2005048085 A2 | 5/2005 |
| WO | 2007030304 A2 | 3/2007 |

OTHER PUBLICATIONS

"Volume Snapshot Manager," White Paper, StorageCraft Technology Corporation, pp. 1-6, Draper, 2004.

Shrira, L., et al., "Thresher: An Efficient Storage Manager for Copy-on-write Snapshots," May 2006.

Application Software Partner Engineering (ASPE), "Sun Storage Tek Data Volume Copy and Sun Storage Tek Data Snapshot Usage with Oracle Databaes," Sun Microsystems, Inc., 2005.

Moh, C., "Snapshots in a Distributed Persistent Object Storage System," Department of Electrical Engineering, Massachusetts Institute of Technology, Massachusetts, pp. 1-62, May 27, 2003.

"Snapshots and Data Protection: The Dot Hill Difference," White Paper, Dot Hill, pp. 1-17, 2005.

Shrira L., et al., "SNAP: Efficient Snapshots for Back-in-Time Execution," Proceedings of the 21st International Conference on Data Engineering, IEEE Computer Society, 2005.

Kim, Y., et al., "Snapshot Technique Using Snapshot Status Table for Shared Storage Supporting Large Capacity," Dept. of Computer System, Electronics and Telecommunications Research Institute, pp. 677-682, 2004.

Krishnan, G., "Rapid Restores from Data Disasters," Computer Technology Review, pp. 1-4, Feb. 1, 2004.

Xiao, W., et al., "Implementation and Performance Evaluation of Two Snapshot Methods on iSCSI Target Storages," pp. 1-11, undated.

Bertrand, C., "Examining Hitachi Copy-on-Write Snapshot Software Capabilities," White Paper, Hitachi Data Systems, pp. 1-29, Aug. 2004.

"Data Protection Strategies for Network Appliance Storage Systems," Network Appliance, Inc., pp. 1-29, Aug. 2006.

Siddha, S., et al., "A Persistent Snapshot Device Driver for Linux," Proceedings of the 5th Annual Linux Showcase & Conference, Nov. 5-10, 2001.

Ji, M., "Instant Snapshots in a Federated Array of Bricks," Jan. 28, 2005, HP Laboratories, Internet Systems and Storage Laboratory, pp. 1-21, Jan. 28, 2005.

International Search Report issued in PCT/US08/055867 dated Jul. 28, 2008.

Supplementary European Search Report issued in EP 08 73 1406, dated May 27, 2011.

U.S. Appl. No. 13/678,881, Varadarajan.

Young, Lee W., "International Search Report" for PCT/US12/65500, as mailed Jan. 29, 2013, 2 pages.

* cited by examiner

PRIOR ART

| Page Number₁ | Offset₁ |
| --- | --- |
| Page Number₂ | Offset₂ |
| ⋮ | ⋮ |

| Offset₁ |
| --- |
| Offset₂ |
| ⋮ |

| Key | Value |
| --- | --- |
| page number | <epoch number, offset> |

METHOD AND APPARATUS FOR EFFICIENTLY MERGING, STORING AND RETRIEVING INCREMENTAL DATA

CROSS REFERENCE TO RELATED APPLICATIONS

This application is based on, and claims priority to, U.S. Provisional Application Ser. No. 60/893,015, filed Mar. 5, 2007, the entire contents of which are hereby incorporated by reference.

BACKGROUND

Field of the Invention

The present invention relates generally to the field of computing. Embodiments of the present invention relate to a method for efficient merging, storage and retrieval of incremental data.

Discussion of the Background

Figure 1:
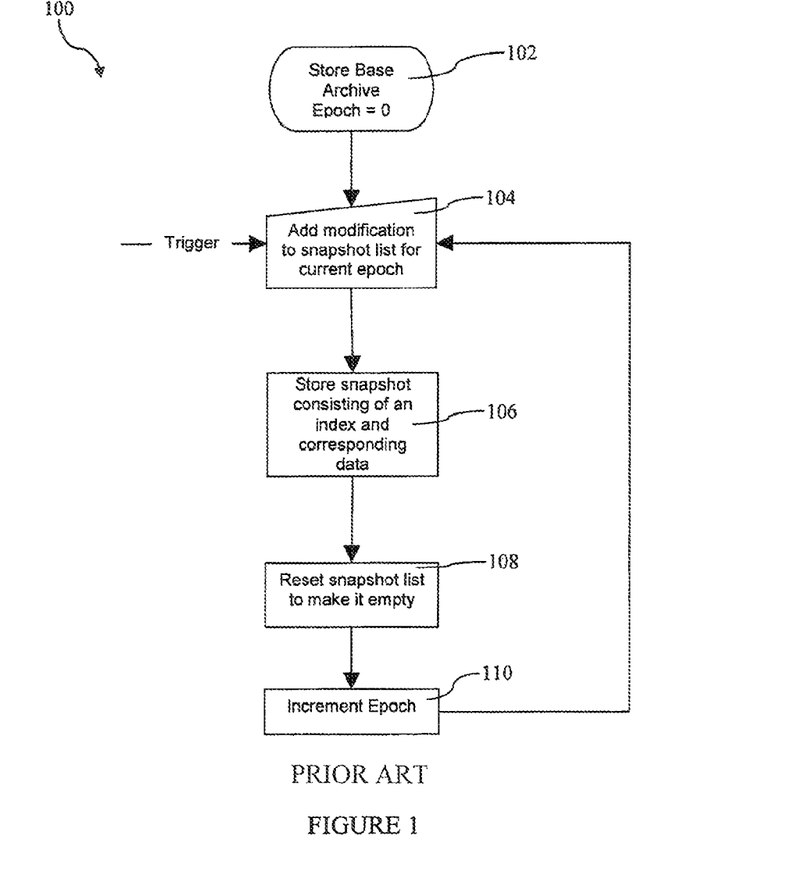
FIG. 1 is a flowchart of a conventional method for storing snapshot data.

As datasets continue to increase in size, mechanisms are needed to efficiently archive and retrieve data. One such mechanism called snapshots consists of (a) taking a base or initial archive of the data, (b) creating a list of modifications to the data within a period of time (called an epoch), (c) storing the snapshot, which consists of an index (that includes the list) and the corresponding modified data, (d) resetting the list to make it empty, and (e) incrementing the epoch and starting the next epoch with step (b). This sequence of actions is depicted in steps 102-110 of the flowchart 100 of FIG. 1.

Data is typically stored in multiples of some fixed granularity. For instance, data is organized as fixed sized sectors on a magnetic disk medium or as a multiple of the sector size in a file system. From hereon, for simplicity, the fixed granularity will be referred to herein as a page. A snapshot thus consists of two components (a) an index, which enumerates the list of pages that have been modified in the epoch and (b) the modified pages.

Figure 2:
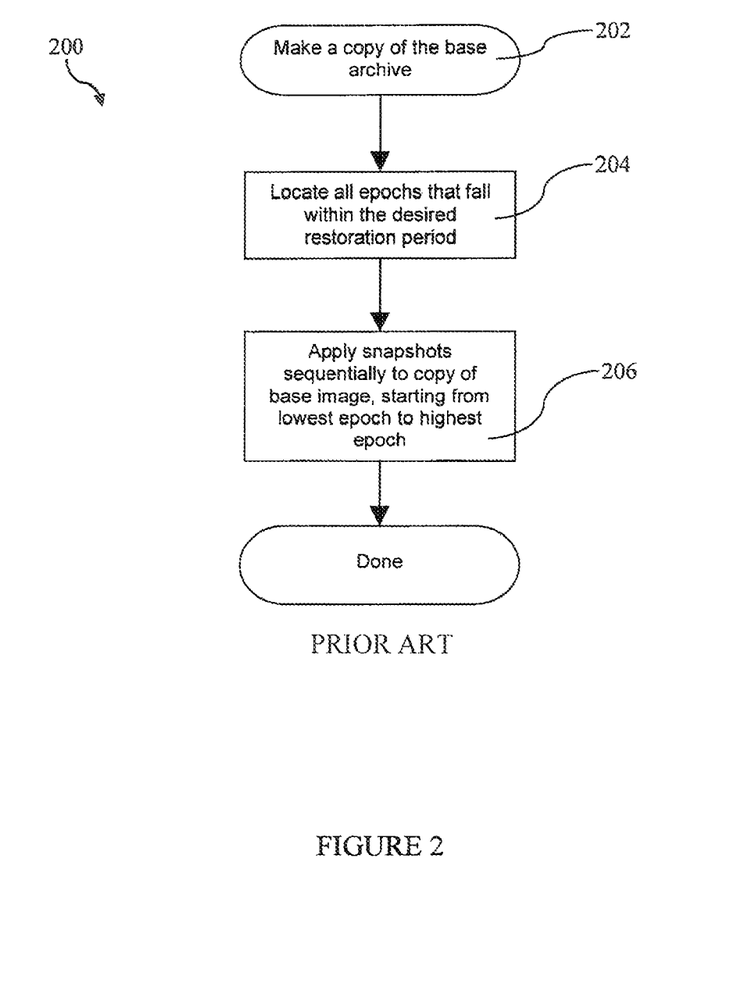
FIG. 2 is a flowchart of a conventional method for restoring data from snapshots to a fixed point in time.

A base archive and a set of snapshots can be used to restore the data to a desired point in time. This is achieved by (a) making a copy of the base archive, (b) locating all epochs that fall within the desired restoration period, and (c) starting with lowest epoch, sequentially applying the snapshots that correspond to each epoch to the copy of the base archive. Since a snapshot consists of an index, which lists the modified pages, applying a snapshot involves overwriting the page in the copy of the base archive with the corresponding page in the snapshot. At the end of this series of operations, the copy of the base archive reflects the contents of the data at the corresponding point in time. This sequence of actions is depicted in steps 202-206 of the flowchart 200 of FIG. 2.

While the above approach to restoring data from a series of snapshots works, it is expensive. Correctness requires that all snapshots within the restoration period be applied sequentially starting with the lowest epoch to the highest epoch. This is required in order to ensure that pages modified multiple times in different snapshots have the correct data. Hence a consistent view of the data can only be obtained after all snapshots have been applied thereby creating a new base image. This mode is sometimes referred to as offline access, since it requires the creation of a new base image to obtain a consistent view of the data.

DETAILED DESCRIPTION

In the following detailed description, a plurality of specific details, such as numbers of epochs and formats of hash tables, are set forth in order to provide a thorough understanding of the preferred embodiments discussed below. The details discussed in connection with the preferred embodiments should not be understood to limit the present invention. Furthermore, for ease of understanding, certain method steps are delineated as separate steps; however, these steps should not be construed as necessarily distinct nor order dependent in their performance.

To reduce the number of IO operations and deliver consistent and low data retrieval time, this document presents a method to create a consistent view of the data at a point in time. This method (a) uses an efficient data structure to track multiple modifications to pages within a set of epochs, (b) automatically orders the modifications to a page such that the most recent modification comes first, and (c) provides efficient access to any page of data without the need to create a new base archive. Because of its efficiency, this method is suitable for recovering data in both online as well as offline fashion.

Figure 3:
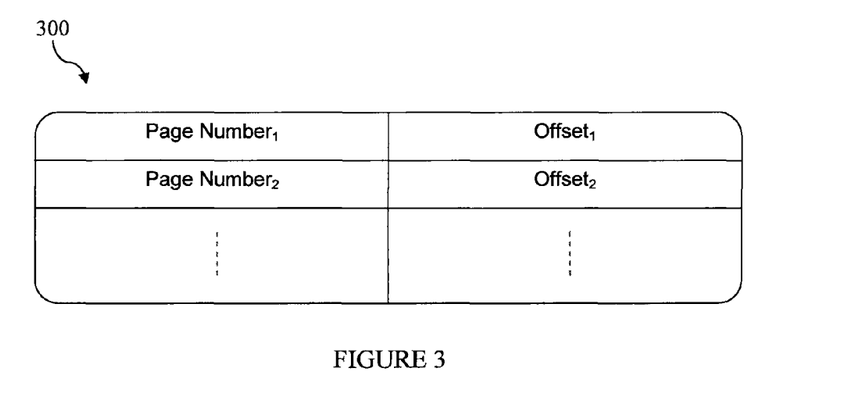
FIG. 3 is a logical representation of an index for a snapshot in a system employing variable length compression according to an embodiment of the present invention.

As mentioned above, each epoch has a corresponding snapshot which consists of (a) an index and (b) data. As shown in FIG. 3, the index 300 consists of tuple entries of the form <page number$_i$, offset$_i$>, where offset$_i$ is the location of page number$_i$ within the snapshot file. Note that any alternate representation can be used for the tuple entries. The use of the offset field enables variable length compressed representation of data and may be eliminated in the case of a fixed length representation. In such a case of fixed length representation, the position of the page number in the index indicates the location of the data for that page.

Figure 4:
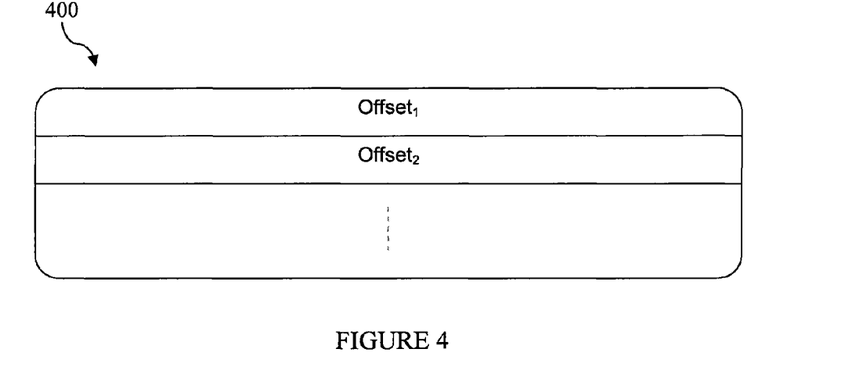
FIG. 4 is a logical representation of an index for a base archive according to an embodiment of the present invention.

The base archive has (a) an index and (b) data. As shown in FIG. 4, entries in the index 400 are of the form <offset$_i$>, where offset$_i$ is the location of page number$_i$ within the data. Since the base file contains all pages in the snapshot, it does not require a field to represent the page number as the pages are stored sequentially in the base file. Note that any equivalent representation can be used for this entry. The use of the offset field enables variable length compressed representation of data in the base file and may be eliminated in the case of a fixed length representation.

Note that one may choose to store the base archived data and snapshots in a number of different ways, including for example, one of: (a) the base archive, and the snapshots (including index and changed data pages) may be stored in a single file, (b) the base archive may be stored in a separate file and the snapshots be stored in a separate single file, or (c) the base archive may be stored in a separate file, and the snapshots may be stored in one or more files, each file containing one or more snapshots, and (d) the data and the index for the base archive and snapshots may be stored in separate files. For the simplicity of discussion and in the preferred embodiment, the data for the base archive and each of the snapshots is stored in separate files.

As the most common use case is to retrieve the latest data as of a certain time, the embodiments discussed herein are discussed in the context of locating and storing the latest version of a page. Extension of this method to locate any version of a page will be readily apparent to any practitioner of ordinary skill in the art.

This method for accessing data as of a point time involves (a) a data structure that provides pointers to the latest modifications to the same page within a set of snapshots, (b) an update mechanism that automatically selects the most recent modification and updates the data structure, and (c) an algorithm that, for each page in the dataset, can efficiently locate the most recently modified page either in the snapshots or in the base archive using the data in the data structure.

Figure 5:
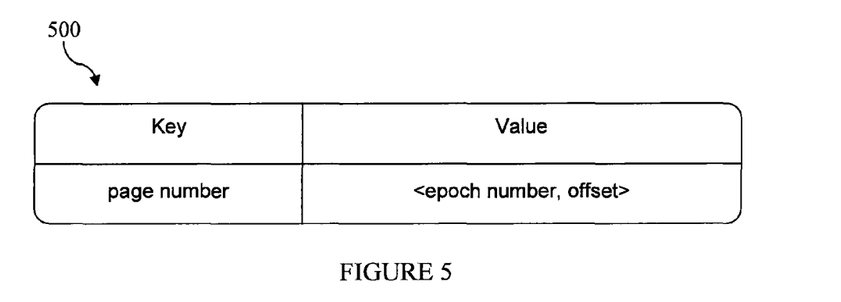
FIG. 5 is a logical representation of an entry in a hash table according to an embodiment of the invention.

To efficiently store the location of the modification to the same page in different snapshots, one method uses a hash table, where the key is the page number and the value associated with the key is used to locate the page's data in the appropriate snapshot file. The hash table may be stored in primary memory, secondary storage, tertiary storage or any combination thereof. Note that while a hash table is an efficient representation, any alternate search representation may also be used in its place (e.g., B-tree, binary search tree, interval tree etc.). The structure of the hash table entry 500 is depicted in FIG. 5.

To get a consistent view of the data at a point in time, the method (a) locates all epochs that fall within the desired restoration period, (b) going from the highest epoch to the lowest epoch, for each epoch, for the page associated with each entry in the associated snapshot index, if there is no entry in the hash table for that page, makes an entry into the hash table using the page number in the snapshot index as the key and the epoch number and the offset in the snapshot index as the value. At the end of this series of operations, the hash table contains one entry for the latest version of each page referenced in any of the snapshots associated with epochs within the desired restoration period.

Figure 6:
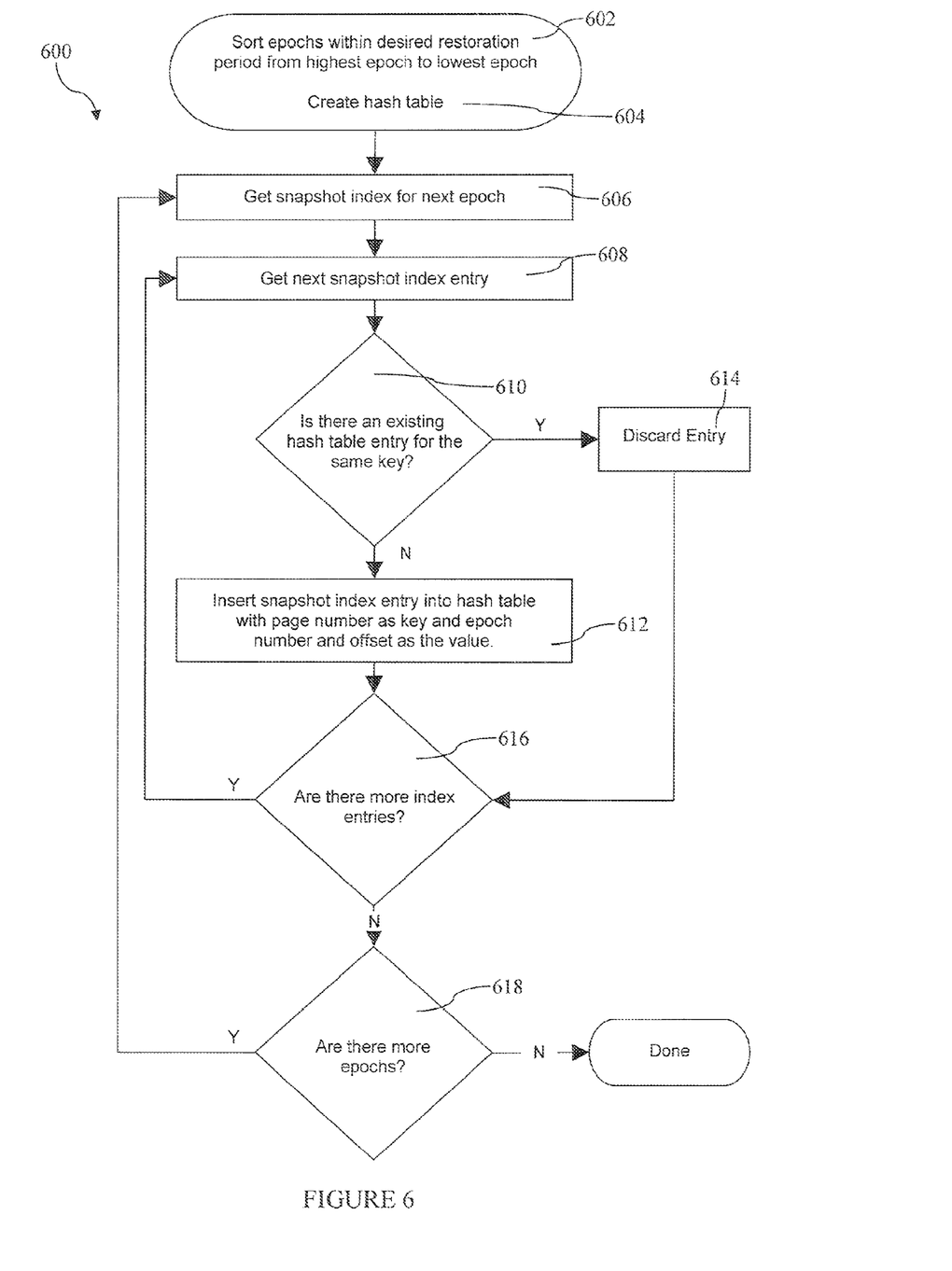
FIG. 6 is a flowchart for a method of constructing a hash table according to an embodiment of the invention.

This sequence of actions is depicted in the flowchart 600 of FIG. 6. The method begins at step 602 with sorting epochs from highest (i.e., most recent) to lowest (i.e., oldest or least recent). Next, the hash table is created by inserting all entries from the index of the most recent epoch into the hash table at step 604. At step 606, the index for the next snapshot is retrieved. The next snapshot index entry is retrieved at step 608. If there is no existing hash table entry with the same page number at step 610, the index entry is entered into the hash table with the page number as the key and the epoch number and offset (in the case of variable length compression schemes) at step 612. If there is an existing hash table entry with the same page number at step 610, the index entry is discarded, i.e., not inserted in the hash table, at step 614. After step 612 or 614 is performed, if there are more entries in the index at step 616, step 608 is repeated. If there are no more entries in the index at step 616, a check is made to determine if there are additional epochs at step 618. If there are more epochs, step 606 is repeated. Otherwise, the process comes to an end.

It should be noted that the process depicted in the flowchart 600 of FIG. 6 is designed to be performed when the first access to the archived and snapshot data occurs for the specified time. Alternately, one can start with the empty data structure after the base archive is made and repeat this process for each new epoch. If the snapshot data system only need be capable of returning the most up-to-date data, then hash tables computed at previous epochs need not be retained. However, in some embodiments, hash tables computed for previous epochs are retained so that any data from any epoch may be retrieved from the snapshot system. When one wishes to rapidly access latest data corresponding to one of many points in time, one can choose to keep locations of multiple modifications to the same page (at different epochs) in the hash table in an ordered fashion, instead of having separate populated hash tables for each point in time.

To access the data associated with any page, this method searches the hash table with the page number as the key. If an entry is found, the associated value yields the epoch number and the offset to locate the associated data. If an entry is not found in the hash table, the method uses the index for the base archive (shown in FIG. 4) to locate the page's data in the base image. Note that the absence of an entry in the hash table is used to indicate that a page has not been modified and the contents of the page in the base image are valid. Alternately, the unmodified pages from the base archive are added to the hash table.

Figure 7:
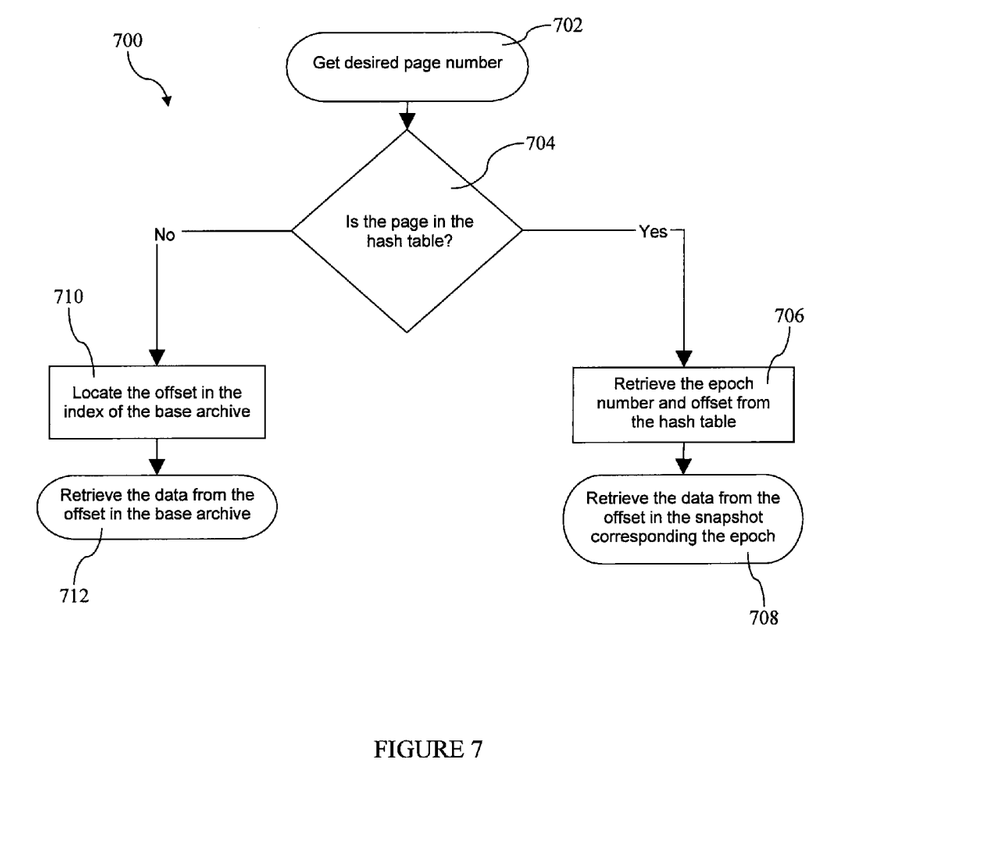
FIG. 7 is a flowchart for a method of locating a desired page using the hash table of FIG. 6.

A flowchart 700 of a method of retrieving data from a snapshot system described above is depicted in FIG. 7. At this point, the hash table for the desired point in time has been created. The method begins at step 702 with the retrieval of a desired page number. Next, the hash table is checked to determine whether the hash table includes an entry with the corresponding page number at step 704. If an entry exists in the hash table at step 704, the epoch number and offset are retrieved from the hash table at step 706, and this information is used to retrieve the desired data from the snapshot in the corresponding epoch at step 708. If no entry exists in the hash table at step 710, then the data is located in the base archive at step 710 and retrieved from the base archive at step 712.

Figure 8:
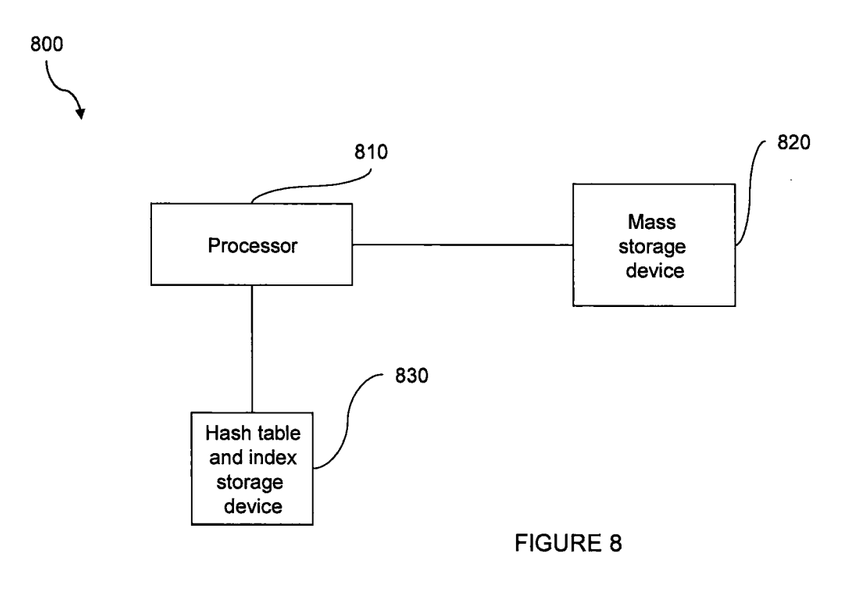
FIG. 8 is a block diagram for a system for implementing the methods of FIGS. 6 and 7.

A block diagram 800 of a system for implementing the methods described above is illustrated in FIG. 8. The system 800 includes a processor 810 that calculates hash tables and indices, and responds to requests, for data stored in the snapshots resident on a mass storage device 820 connected to the processor 830. Also connected to the processor 810 is a storage device 810 for storing hash tables and indices corresponding to the snapshots stored on the mass storage device 820. The storage device 830 is preferably of a higher speed than the mass storage device 820. In alternative embodiments, the hash table and indices for each snapshot may be stored in the mass storage device 820, in volatile RAM or non-volatile flash memory associated with the processor 810, or any other memory.

As discussed above, data structures other than a hash table may be used to efficiently locate the most recently modified page either in the snapshots or in the base archive. In preferred embodiments, the data structure is created when the first request for data in a corresponding epoch is received. In other embodiments, the data structure is created at or near the time that the snapshot is completed. In both of these embodiments, the data structure covers all pages in a desired set of pages. It should be understood, however, that the data structure may cover only a portion of a set of pages and may be created at any time between creation of the snapshot and retrieval of a page within the set of pages or the relevant portion of the set of pages. In some embodiments, the desired set of pages includes all pages stored on a physical device or on a set of physical devices. In other embodiments, the desired set of pages corresponds to a folder or other logical division of a physical device or a set of physical devices.

It will be apparent to those of skill in the art that numerous variations in addition to those discussed above are also possible.

Examples of such variations are, but not limited to:
1) Data storage method: (a) the base archive, and the snapshots (including index and changed data pages) may be stored in a single file, (b) the base archive may be stored in a separate file and the snapshots be stored in a separate single file, or (c) the base archive may be stored in a separate file, and the snapshots may be stored in one or more files, each file containing one or more snapshots, and (d) the data and the index for the base archive and snapshots may be stored in separate files; the content of value field in the hash table are affected by specifics of the data storage method;
2) The table representing the data for or up to an epoch may be stored as a hash table or some other data structure such as B-tree, etc.;
3) One may construct the table going from the latest data to the oldest data epochs or in the reverse order;
4) One may choose to include or not include the pages from the base archive into the table;
5) When constructing table corresponding to an epoch, one may choose to save the tables corresponding to different epochs;
6) The pages may be of fixed size or variable size; and may consist of physically contiguous or dis-contiguous data blocks.

Therefore, while the invention has been described with respect to certain specific embodiments, it will be appreciated that many modifications and changes may be made by those skilled in the art without departing from the spirit of the invention. It is intended therefore, by the appended claims to cover all such modifications and changes as fall within the true spirit and scope of the invention.

Furthermore, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method comprising:
receiving a request for a plurality of pages in a set of incrementally stored data as of a desired time;
wherein the set of incrementally stored data comprises a base archive and a plurality of snapshots;
wherein each snapshot corresponds to a distinct epoch of a plurality of epochs, each epoch comprising a time period after creation of the base archive;
wherein each snapshot comprises:
a single revised version of each page of data that was changed in the distinct epoch; and
an index that indicates, for each page that was changed in the distinct epoch, an identity of the page and a location of the single revised version of the page; and
going from most-recent epoch to least-recent epoch, searching the index of each snapshot corresponding to an epoch later than creation of the base archive and no later than the desired time to identify a location of a most recent version of each page of data that was changed during the epoch;
storing, in a hash table, each location of each most recent version identified in the searching step, wherein the hash table utilizes a hash function to assign each page number to a unique value, wherein the unique value determines data associated with each said page number;
searching the hash table for an entry corresponding to a desired page;
if an entry corresponding to the desired page is found, retrieving the data from the snapshot corresponding to the epoch identified by the entry;
if an entry is not found in the hash table, retrieving the data from the base archive; and
wherein the desired time is later than the creation of the base archive and wherein data in each revised version of each page in a snapshot is later than the data in each corresponding page of the base archive.

2. The method of claim 1, wherein the searching step and the storing step for each snapshot corresponding to the epoch are performed prior to a completion of a subsequent snapshot.

3. The method of claim 1, wherein the searching step and the storing step for each snapshot corresponding to the epoch are performed after the request is received.

4. The method of claim 1, wherein the plurality of pages corresponds to all pages stored on one or more physical devices.

5. The method of claim 1, wherein the plurality of pages corresponds to a logical division of pages stored on one or more physical devices.

6. The method of claim 5, wherein the logical division is a folder.

7. The method of claim 1, wherein data is stored in variable length pages.

8. A device comprising:
a processor;
a memory connected to the processor; and
an interface connected to the processor, the interface being operable to:
communicate on a storage device on which a set of incrementally stored data is stored;
wherein the set of incrementally stored data comprises a base archive and a plurality of snapshots;
wherein each snapshot corresponds to a distinct epoch of a plurality of epochs, each epoch comprising a time period after creation of the base archive;
wherein each snapshot comprises:
a single revised version of each page of data that was changed in the distinct epoch; and
an index that indicates, for each page that was changed in the distinct epoch, an identity of the page and a location of the single revised version of the page; and
wherein the processor is configured to perform the steps of:
receiving a request for a plurality of pages in the set of incrementally stored data as of a desired time;
going from most-recent epoch to least-recent epoch, searching the index of each snapshot corresponding to an epoch later than creation of the base archive and no later than the desired time to identify a location of a most recent version of each page of data that was changed during the epoch;
storing, in a hash table, each location of each most recent version identified in the searching step in a memory, wherein the hash table utilizes a hash function to assign each page number to a unique value, wherein the unique value determines data associated with each said page number;

searching the hash table for an entry corresponding to a desired page;

if an entry corresponding to the desired page is found, retrieving the data from the snapshot corresponding to the epoch identified by the entry;

if an entry is not found in the hash table, retrieving the data from the base archive; and wherein the desired time is later than the creation of the base archive and wherein data in each revised version of each page in a snapshot is later than the data in each corresponding page of the base archive.

9. The device of claim 8, wherein the searching step and the storing step for each snapshot corresponding to the epoch are performed prior to a completion of a subsequent snapshot.

10. The device of claim 8, wherein the searching and the storing step for each snapshot corresponding to the time period are performed after the request is received.

11. The device of claim 8, wherein the plurality of pages corresponds to all pages stored on one or more physical devices.

12. The device of claim 8, wherein the plurality of pages corresponds to a logical division of pages stored on one or more physical devices.

13. The device of claim 12, wherein the logical division is a folder.

14. The device of claim 8, wherein data is stored in variable length pages.

* * * * *